United States Patent [19]

Baker

[11] 4,276,356
[45] Jun. 30, 1981

[54] MATRIX MEMBER FOR CONTAINING FUEL CELL ACID ELECTROLYTE

[75] Inventor: Bernard S. Baker, Brookfield Center, Conn.

[73] Assignee: Energy Research Corporation, Danbury, Conn.

[21] Appl. No.: 24,416

[22] Filed: Mar. 27, 1979

[51] Int. Cl.$^3$ ............................................. H01M 8/02
[52] U.S. Cl. ...................................... 429/41; 429/44; 429/46
[58] Field of Search ...................... 429/41, 44, 46, 40, 429/13, 14, 34

[56] References Cited

U.S. PATENT DOCUMENTS

| | | | |
|---|---|---|---|
| 2,947,797 | 8/1960 | Justi et al. | 429/13 |
| 3,201,282 | 8/1965 | Justi et al. | 429/13 |
| 3,202,546 | 8/1965 | Rightmire et al. | 429/46 X |
| 3,284,243 | 11/1966 | Von Sturm | 429/40 |
| 3,300,343 | 1/1967 | Huber et al. | 429/34 |
| 3,382,067 | 5/1968 | Sandstede et al. | 75/208 R |
| 3,423,247 | 1/1969 | Darland, Jr. et al. | 429/40 |
| 3,453,149 | 7/1969 | Adlhart et al. | 429/46 |
| 3,481,737 | 12/1969 | Siebenberg et al. | 429/41 |
| 3,513,029 | 5/1970 | Giner | 429/44 |
| 3,519,486 | 7/1970 | Huebscher et al. | 429/41 |
| 3,575,718 | 4/1971 | Adlhart et al. | 429/46 |
| 3,615,845 | 10/1971 | Gray | 429/34 |
| 3,855,002 | 12/1974 | Schroll | 429/41 |
| 4,007,059 | 2/1977 | Witherspoon et al. | 429/46 X 7n |
| 4,017,664 | 4/1977 | Breault | 429/44 |

FOREIGN PATENT DOCUMENTS 2002571 2/1979 United Kingdom .
1541541 3/1979 United Kingdom .

OTHER PUBLICATIONS

Maru et al., "Composite Model of Electrode-Electrolyte Pore Structures", Extended Abstracts of Battery Division of the Electrochemical Society, Inc., vol. 76-2, pp. 82-85.

Primary Examiner—Anthony Skapars
Attorney, Agent, or Firm—Watson, Leavenworth, Kelton & Taggart

[57] ABSTRACT

A matrix member for carrying the acid electrolyte of a fuel cell comprised of a first layer containing a carbon material and a second layer containing a silicon carbide material. A further matrix member is disclosed wherein the mean pore size of the member is substantially equal to or less than that mean pore size of at least one of the fuel cell electrodes.

17 Claims, 6 Drawing Figures

MATRIX MEMBER FOR CONTAINING FUEL CELL ACID ELECTROLYTE

BACKGROUND OF THE INVENTION

This invention pertains to fuel cells and, in particular to a matrix member for retaining the electrolytes employed in these cells.

In recent years, a significant amount of effort has been expended in the development of commercially viable fuel cells. A fuel cell typically comprises two spaced electrodes between which is disposed an ion carrying electrolyte and to which are fed respective fuel and oxidant reactant gases. In a fuel cell of this type, proper selection of the ion carrying electrolyte is essential if the fuel cell is to operate satisfactorily. To this end, it has been found advantageous to employ strong acids such as, for example, $H_2SO_4$ and $H_3PO_4$, as the cell electrolyte, since these acids minimize power losses caused by polarization and electrolyte resistance. However, with such a liquid acid as the cell electrolyte, it becomes difficult to contain the electrolyte between the cell electrodes. Furthermore, while solid electrolytic members are available, these members generally have a greater resistance than the aforesaid liquid acid electrolytes. Thus, while these solid electrolytes can be more readily contained between the cell electrodes, their increased resistance prevents any significant improvement in cell operation over that achievable with liquid acid electrolytes.

In order to gain the high ionic conductivity benefit of liquid acid electrolytes, matrix members have been developed for compatibly supporting the liquid acid electrolytes. With such matrix members, the acid electrolyte is confined within the member and, hence, is prevented from flowing from between the cell electrodes. Additionally, the matrix member acts as a barrier to prevent crossover of the fuel and oxidant gases being fed to the electrodes.

U.S. Pat. No. 3,575,718 discloses one type of matrix member wherein the member comprises two adjacently arranged layers, each having a concentrated liquid acid immobilized therein and one of which borders the cell anode electrode and the other the cell cathode electrode. The layer bordering the anode electrode contains (by weight) from 5-90 percent carbon powder and from 5-90 percent fluorocarbon polymer gel. The carbon powder of this layer is stable in acids and has a surface area of at least about 1 square meter per gram, so as to permit the containment of an increased acid content. This increased acid content affords the layer and, hence, the matrix a high ionic or electrolytic conductivity. The layer bordering the cathode electrode, which is thinner of the two layers, in turn, comprises from 70-95 percent non-carbon inert inorganic compounds and from 5-90 percent fluorocarbon polymer gel. The inert inorganic compounds of this second layer have a low electronic conductivity and, thus, contribute this property to the matrix. The inert compounds also prevent matrix deformation, as well as promote liquid acid confinement.

U.S. Pat. Nos. 4,000,006 and 4,017,664 disclose a second type of matrix member wherein the matrix is in the form of a single layer comprised of at least 90 percent silicon carbide. The remainder of the layer is formed from a fluorocarbon polymer which acts as a binder for preventing shifting of the layer. In this matrix, the silicon carbide material itself affords the matrix the desired electrolytic, electronic and chemical stability properties.

It is an object of the present invention to provide an improved matrix member for use in supporting the liquid acid electrolyte of a fuel cell.

It is a further object of the present invention to provide a stable matrix member having high electrolytic conductivity and low electronic conductivity, while being capable of inhibiting reactant gas crossover at high pressures.

It is a further object of the present invention to provide a matrix of the last mentioned type having a bubble pressure approaching 50 psi.

SUMMARY OF THE INVENTION

In accordance with a first aspect of the present invention, the above and other objectives are realized in a matrix member comprised of first and second adjacently arranged layers, the first layer including a carbon material and the second layer a silicon carbide material.

Preferably, each of these layers further includes a binder material such as, for example, a fluorocarbon polymer. It is further preferable, that the carbon material have a surface area greater than approximately 100 square meters per gram, and a particle size which is less than approximately 500 angstroms. Where a binder material is included in each of the first and second layers, the binder should preferably be equal to or less than 4 percent of the total content of the layer.

In use, the matrix, after saturation with the acid electrolyte, is disposed within the fuel cell sandwiched between the cathode and anode electrodes. The construction of the first matrix layer is found to provide excellent isolation of the gases feeding these electrodes, such isolation being satisfactorily maintained for pressures approaching 50 psi. Furthermore, the first and second layers together provide a high ionic conductivity and the necessary stability under high temperatures, while the second layer further provides a low electronic conductivity. An overall fuel cell is realized having the desired conductivity, stability and gas isolation properties.

In a further aspect of the present invention, a matrix member is provided whose mean pore size is substantially equal to or less than the mean pore size of at least one of the fuel cell electrodes. In preferable practice, in accordance with this aspect of the invention, the matrix member comprises adjacently arranged silicon carbide and carbon layers, as in the previously discussed practice, and the mean pore size of the carbon layer is selected to be equal to or less than that of the cell cathode electrode.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
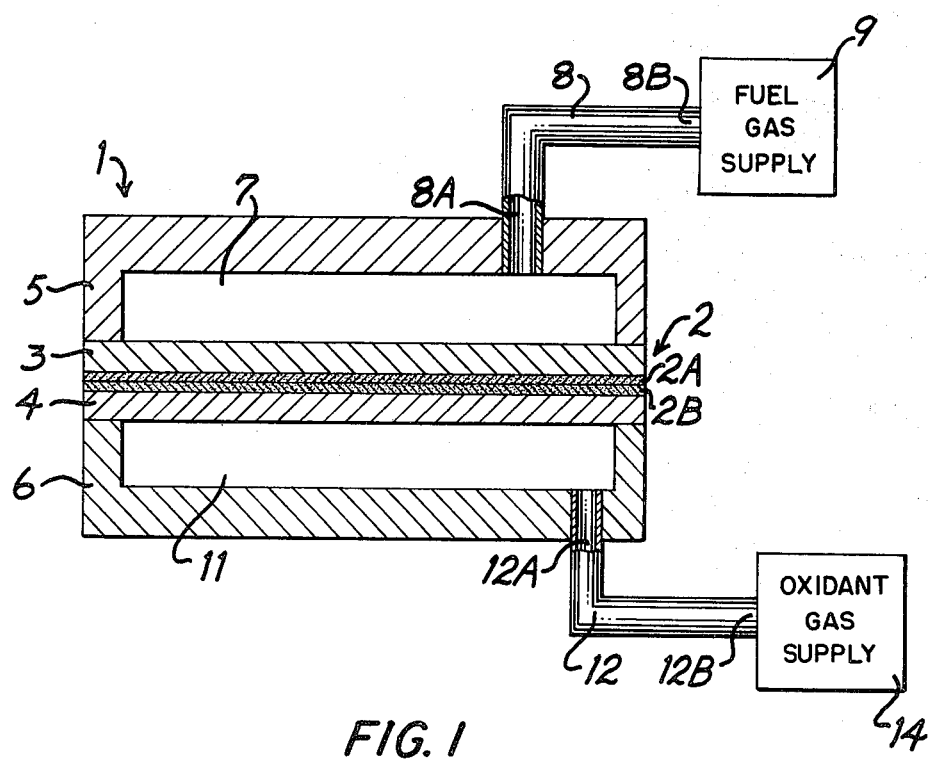
FIG. 1 illustrates a fuel cell incorporating a matrix member in accordance with a first practice of the present invention.

FIG. 1 illustrates a fuel cell 1 employing an electrolyte carrying or containing matrix member 2 in accordance with the principles of the present invention. More particularly, the matrix 2 is saturated with a strong liquid acid electrolyte such as, for example, phosphoric acid, and is sandwiched between a pair of spaced apart conventionally constructed diffusion electrodes 3 and 4. The electrode-matrix assembly is further confined between a pair of gas separator plates 5 and 6 which also collect the current produced. The separator plate 5 is arranged in facing relationship to the electrode 3 and defines therewith a fuel gas reactant chamber 7. Fuel gas is supplied to the chamber 7 through a conduit 8 having one of its ends 8A communicating with the chamber and the other of its ends 8B communicating with a fuel supply 9. The other separator plate 6, in turn, is disposed to face the electrode 4 and therewith defines an oxidant reactant gas chamber 11. The latter chamber receives oxidant gas through a second conduit 12 whose one end 12A communicates with the chamber and whose other end 12B connects to an oxidant gas supply 14.

Spent fuel exits from chamber 7 by means of an exit tube (not shown) and spent oxidant, oxygen and nitrogen, and product water exit from chamber 11 by means of a discharge tube (not shown).

In accordance with the invention, the electrolyte carrying matrix 2 comprises first and second layers 2A and 2B which together are adapted to provide improved cell performance at high temperatures and high pressures. More specifically, in accord with the invention, one of these layers is comprised of a carbon material and the other is comprised of a silicon carbide material. In the present illustrative embodiment, the carbon containing layer is the second layer 2B and, thus, lies adjacent the electrode 4 which, as can be appreciated, serves as the cell cathode electrode. The silicon carbide layer, in turn, serves as the first layer and therefore abuts the electrode 3 which functions as the cell anode electrode.

In preferred form, the first and second layers additionally each comprise a binder material which serves to bind the respective carbon and silicon materials and to aid in containing the acid electrolyte. A preferable binder material for this purpose is a fluorocarbon polymer. A typical fluorocarbon polymer might be polytetrafluoroethylene (PTFE).

The combined presence of the silicon carbide containing layer 2A and the carbon containing layer 2B of the matrix 2 is found to provide substantially high overall electrolytic conductivity for the cell. Additionally, the carbon containing layer 2B is found to provide a pronounced inhibiting effect on the tendency of the gas reactants in the chambers 7 and 22 to crossover and mix with one another. This inhibiting effect is particularly pronounced and can be found to occur for high bubble pressures approaching 50 psi when carbon materials having a surface area greater than approximately 100 square meters per gram and a particle size of less than 500 angstroms are used as the material of the layer. Carbons having the aforesaid properties are thus preferred for the layer 2B. Some typical carbons might be vulcan XC-72 and conductex.

Carbons characterized as above produce the resultant crossover inhibiting effect and provide high bubble pressures due to the relatively small, (i.e., less than 0.2 micron) mean pore size possessed by these carbons. Table I below shows the mean pore sizes for a number of conventional matrices as compared to the matrix of the present invention. The first two matrix structures are fibrous phenolic structures, the first listed structure comprising Kynol phenolic fibers and the second structure a phenolic fiber manufactured by W. R. Grace. These structures have measured mean pore sizes of 1 and 0.3 microns and measured bubble pressures of 5–8 and 13 psi respectively. The next matrix is a single layered silicon carbide structure. This matrix has a measured bubble pressure of 5–10 psi and a corresponding pore size estimated therefrom of from 0.4 to 1.0 microns. The fourth matrix structure is the single layer silicon carbide matrix of the example of the above-mentioned '006 patent. This matrix was stated in such patent as having a bubble pressure of 1.1–1.5 psi which corresponds to an estimated mean pore size of about less than 10 microns. The last matrix is one constructed in accordance with the invention. This matrix has a measured mean pore size of 0.12 microns and provides a resultant bubble pressure of 45 psi. The superiority of the matrix of the present invention is apparent.

TABLE I

MEAN PORE SIZES AND BUBBLE PRESSURES OF VARIOUS MATRIX STRUCTURES

| TYPE | MPS ($\mu$) | | BUBBLE PRESSURE (psi) |
|---|---|---|---|
| Phenolic | 1 | | 5–8 |
| Phenolic | .3 | | 13 |
| SiC | .4–1.0 | (Estimated value) | 5–10 |
| SiC | 10 | (Estimated value) | 1.1–1.5 |
| Carbon/SiC | 0.12 | | 45 |

Table II below further compares the percentage of pores below given pore sizes for the matrix of invention of Table I and a phenolic fiber matrix. This table shows clearly that 20% of the pores of the matrix of the invention have diameters of less than 0.04 microns. This high percentage of small pores also plays a role in determining the high bubble pressures achieved with the present matrix, and this role is especially pronounced when the largest pores have diameters which are an order of magnitude less than the thickness of the carbon layer.

TABLE II

| % OF PORES LESS THAN INDICATED PORE SIZE | | |
|---|---|---|
| PORE SIZE ($\mu$) | PHENOLIC | CARBON/SiC |
| .9 | 10 | 80 |
| .1 | 8 | 43 |
| .04 | 7 | 20 |
| .01 | 3 | 3 |

In order to prevent degrading of the crossover inhibiting effect brought about by the layer 2B when a fluorocarbon polymer is included in the layer, it is preferable that the fluorocarbon be limited to less than approximately 4 percent of the total content of the layer. This amount of fluorocarbon will also not degrade wetting of the layer by the acid electrolyte.

As above-indicated, the layer 2A is comprised of silicon carbide which, as discussed above, has a low electronic conductivity. Thus, the layer 2A provides the necessary electronic insulation between the cell electrodes 3 and 4.

As can be appreciated, the relative content of the matrix 2 provided by each of the layers 2A and 2B will depend on the ionic and electronic conductivities and the bubble pressure required in a particular application.

EXAMPLE I

Figure 2:
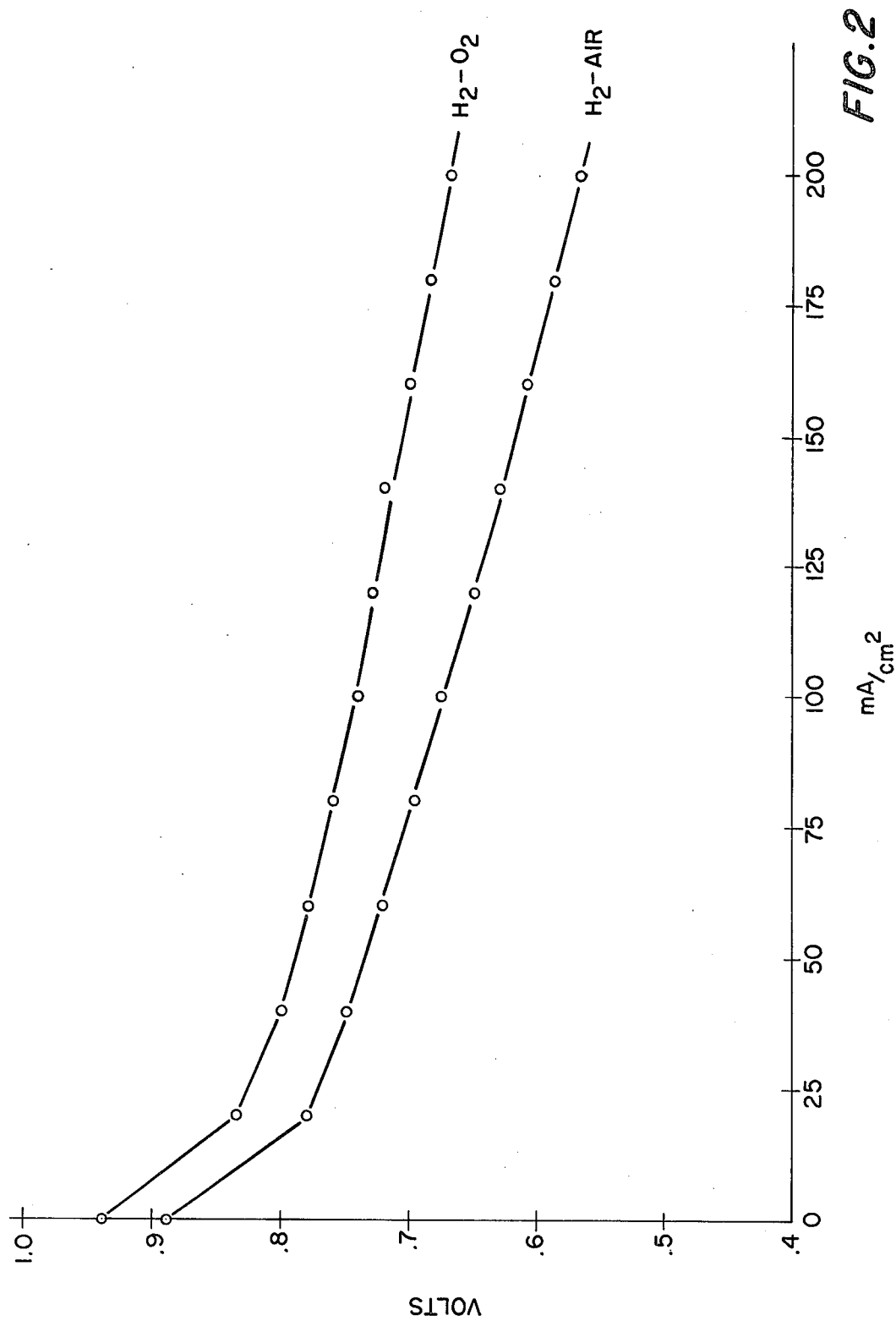
FIGS. 2 and 3 show representative plots of fuel cell output voltage versus fuel cell current density for fuel cells employing matrices in accordance with the matrix of FIG. 1.

A fuel cell was constructed from anode and cathode electrodes, each formed from carbon and an overlayer of platinum which amounted to about 10 percent of the content of the electrode. A matrix saturated with phosphoric acid was disposed between the electrodes and comprised a 0.004 inch layer of silicon carbide and a 0.010 inch layer of carbon. Each layer was further provided with a PTFE binder amounting to two and one-half percent of the content of the layer. The matrix was arranged with the carbon layer adjacent the cell anode electrode and the silicon carbide layer adjacent the cell cathode electrode. FIG. 2 shows the resultant voltage output of the cell after 216 hours of operation for various cell current densities and two oxidant-fuel gas combinations. In one case, the fuel gas was hydrogen and the oxidant gas, oxygen. In the other case, hydrogen was again used as the fuel gas, but the oxidant gas was air. In both cases, the cell temperature was 355° F.

EXAMPLE II

Figure 3:
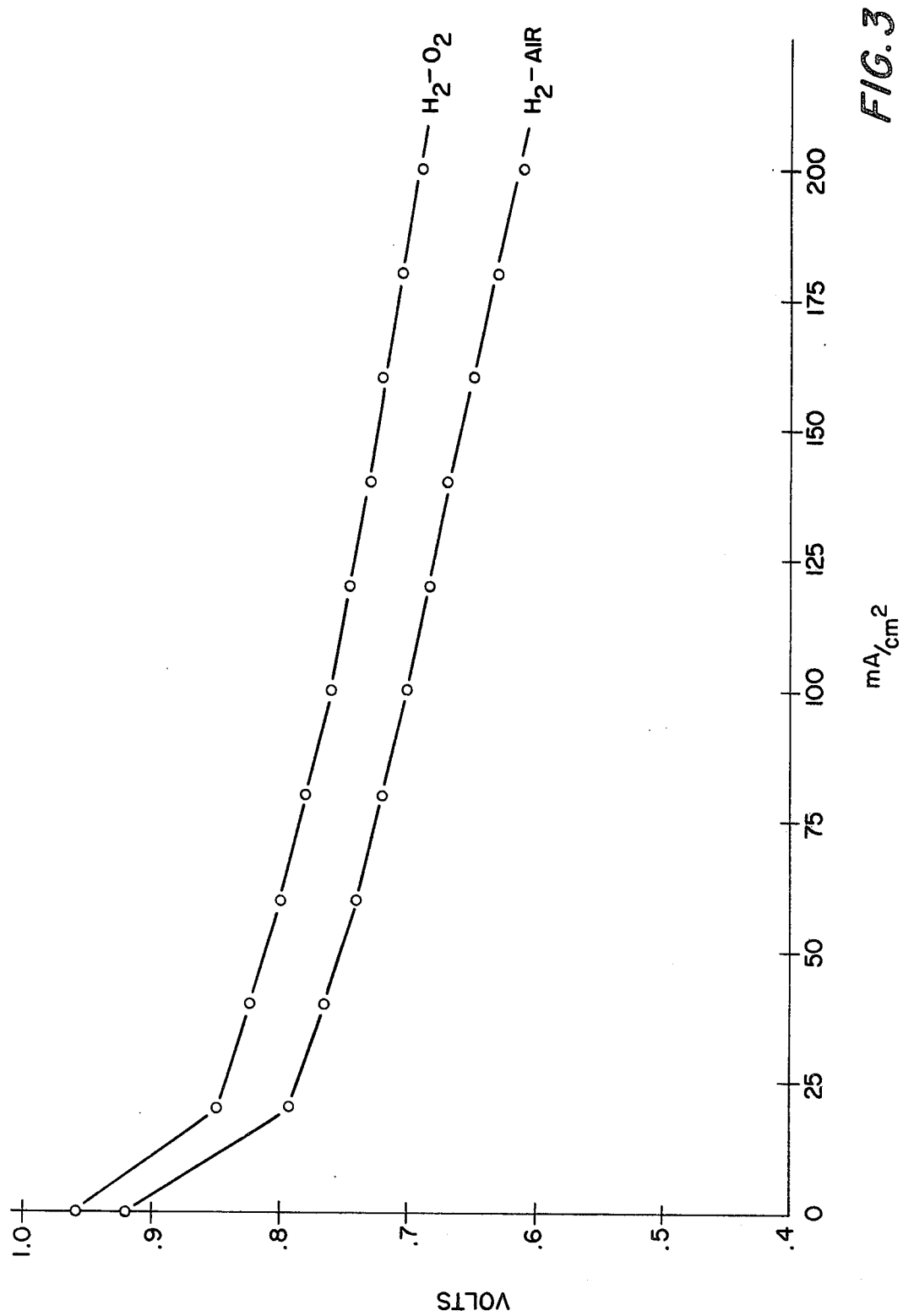

This example was conducted using the same electrode and matrix configurations and make-up in the previous example, but with the silicon layer adjacent the cathode and the carbon layer adjacent the anode. The resultant cell output voltage after 144 hours of cell operation for various cell current densities is plotted in FIG. 3 for the same fuel-oxidant gas combinations as in Example I. Again the temperature of the cell was 355° F.

EXAMPLE III

In this example, a fuel cell employing a matrix in accord with the invention and a fuel cell employing a more conventional matrix were operated over a long term (4000 hours), and the tendency of each matrix to lose electrolyte was ascertained. The matrix in accord with the invention comprised a 0.006 inch thick silicon carbide layer having 2 percent PTFE binder and situated adjacent the cell cathode. The carbon layer was 0.008 inches thick and also contained 2 percent PTFE binder. The conventional matrix comprised Kynol phenolic fibers and phenolic resin.

Figure 4:
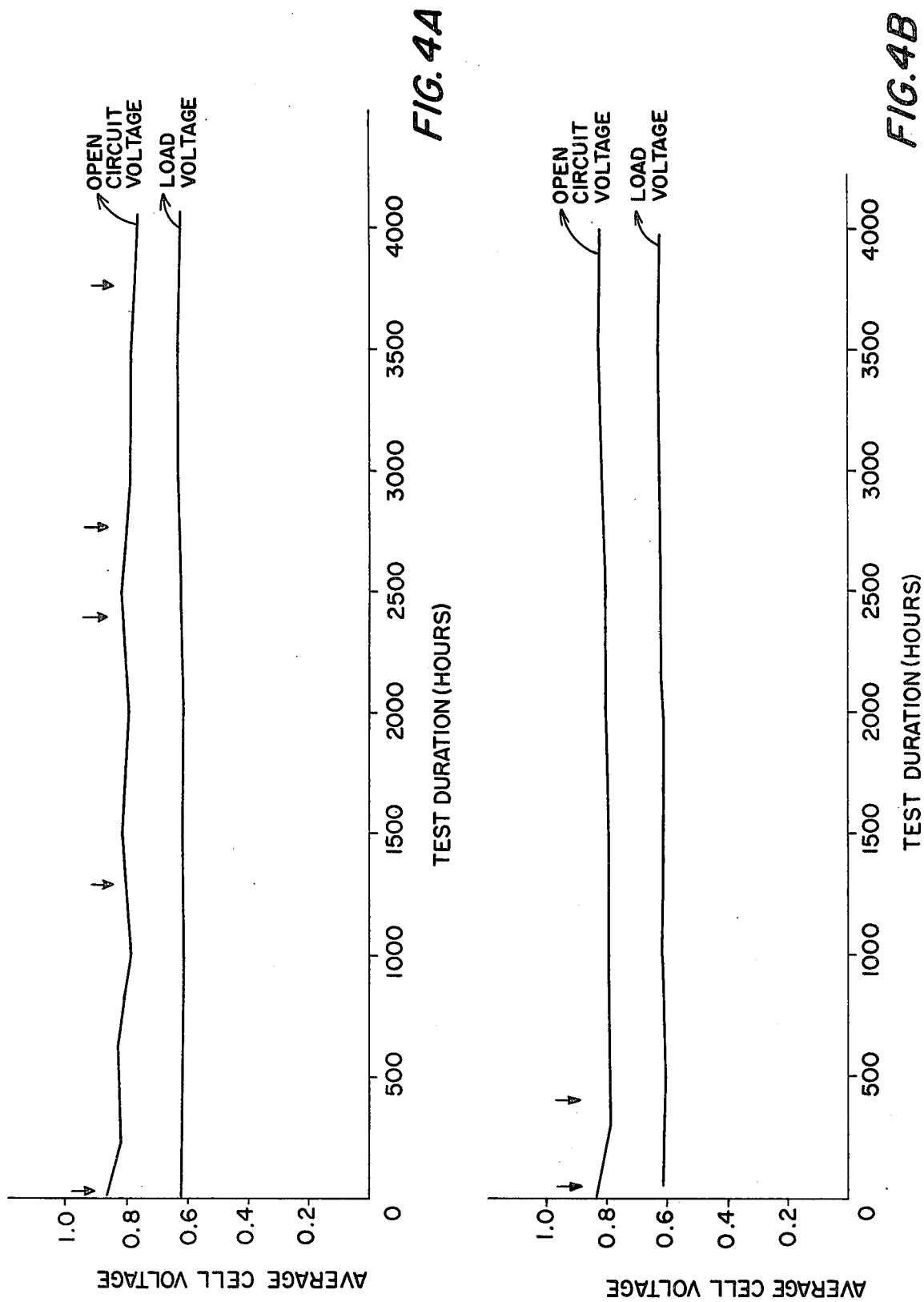
FIGS. 4A and 4B depict graphs showing frequency of acid electrolyte addition to respective fuel cells employing a conventional matrix and a matrix in accord with the matrix of FIG. 1.

FIGS. 4A and 4B depict the mean cell voltage for open circuit and load conditions for the phenolic matrix cell and for the cell of the invention, respectively. Also indicated by the vertical arrows in each figure are the times at which acid had to be added to each cell. As seen by these figures, the cell employing the matrix of the present invention after the initial addition of acid only needed one further acid addition during the entire 4000 hours of operation. In contrast, the cell employing the phenolic fiber matrix needed acid addition five times during this period. Hence, this demonstrates the superior stability and acid retention capabilities of the matrix of the present invention as compared to prior fibrous matrix structures.

In a further aspect of the present invention, the matrix member 2 of the fuel cell 1 is adapted to have a mean pore size which is substantially equal to or less than the mean pore size of at least one of the cell electrodes 3 and 4. In preferred practice in accordance with this aspect of the invention, the member 2 is formed as in FIG. 1 with first and second layers 2A and 2B comprised of silicon carbide and carbon, respectively, and the mean pore size of the carbon layer 2B of the matrix is selected to be equal to or less than the mean pore size of the cathode electrode 4.

In conventional fuel cell construction, the cell electrodes are typically formed with an underlayer of carbon to support the electrode active material. The present practice can thus be easily adapted to conventional fuel cell construction by utilizing the same carbon material for both the matrix layer 2B and the carbon support of the cathode electrode 4.

Selection of the mean pore size of the matrix member 2 in the above manner is found to provide a fuel cell performance characteristic which departs unexpectedly from performance characteristics of known fuel cells. In particular, fuel cell performance is found to improve, rather than degrade, with increasing time of operation. This improved performance is believed to be due to the fact that the mean pore size of the matrix in relation to the mean pore size of the cathode electrode tends to inhibit migration of the matrix acid to the cathode electrode when the electrode begins to lose its hydrophobicity.

In further practice in accordance with this further aspect of the present invention, the carbon layer 2B is selected to have a mean pore size substantially equal to or less than the mean pore sizes of both the cathode and anode electrodes 4 and 3 of the fuel cell 1.

EXAMPLE IV

This example illustrates this further aspect of the present invention and was conducted with a fuel cell configuration as in Example III wherein the material of the carbon layer 2B had a mean pore size of less than 0.2 microns and was the same as the carbon material employed as the underlayer of the cathode and anode electrodes.

Figure 5:
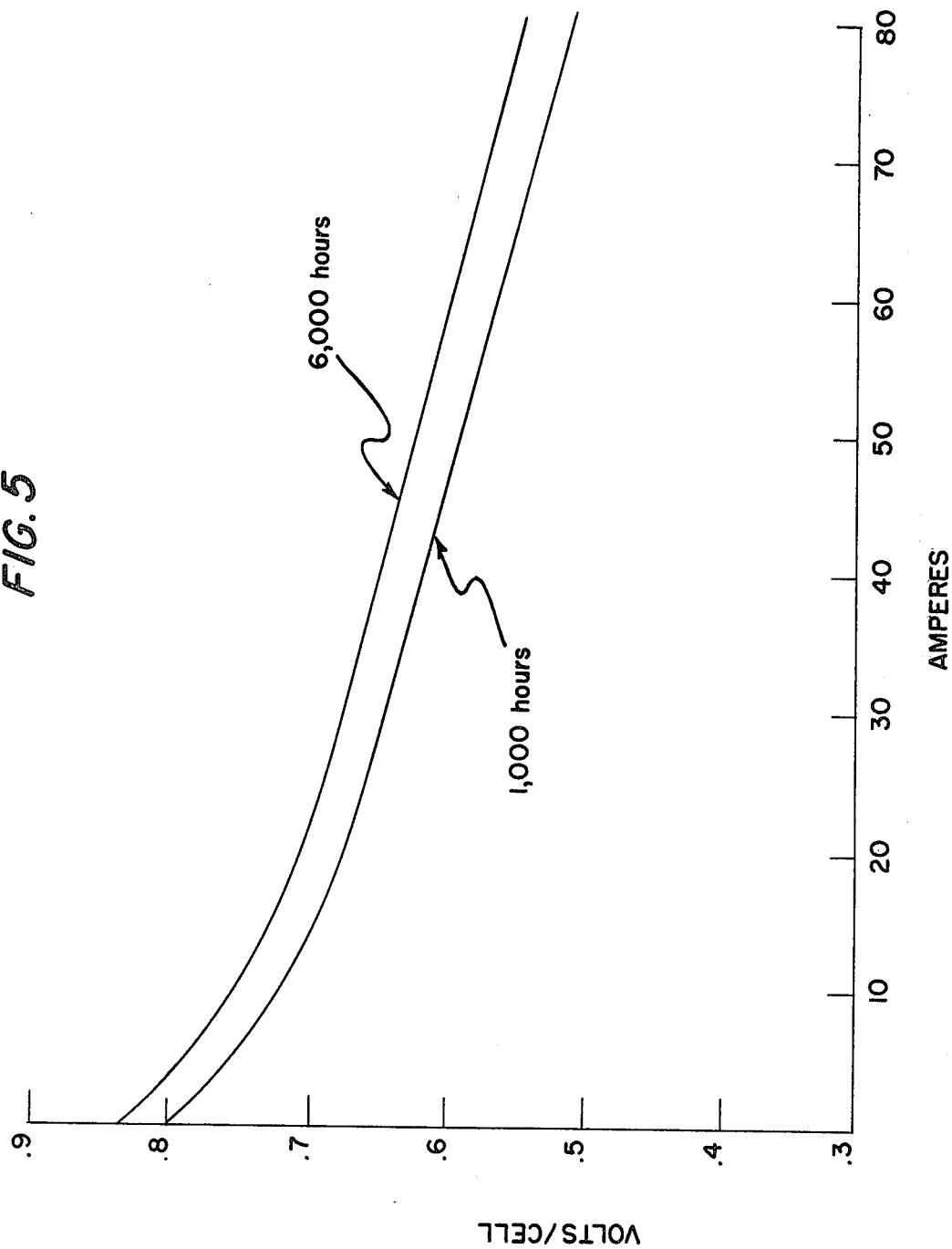
FIG. 5 shows the graphs of fuel cell output voltage versus fuel cell current after 1000 and 6000 hours of operation of a fuel cell employing a matrix in accordance with the matrix of FIG. 1 and a further practice of the present invention.

FIG. 5 shows the fuel cell output voltage versus fuel cell current after 1000 and 6000 hours of operation. As is apparent, the cell output voltage shows an increase after 6000 hours of operation for all cell output currents. This increase in output voltage with time represents a marked departure from conventional fuel cells substantially all of which show a decrease in output voltage after 5000 hours of operation.

A possible explanation for the improved performance exhibited by fuel cells in accordance with this aspect of the present invention may be had by considering the decay mode for fuel cells of the present type. One explanation for such decay is that it occurs because of flooding of the cathode electrode with the acid electrolyte. This flooding causes the oxygen in the oxidant gas to experience an increased diffusion resistance as it moves to the electrode reaction sites. The flooding itself may be a result of a gradual oxidation of the carbon support in the electrode. As the carbon oxidizes it separates from the polytetrafluoroethylene waterproofing binder present in the electrode. In known fuel cell constructions, under such condition, the acid electrolyte would be transported by capillary action from the cell matrix to the now non-hydrophobic portions of the electrode thereby flooding same, since the mean pore size of the matrix is normally larger than the mean pore size of the electrode carbon support. In accordance with the present practice, this flooding is avoided, since the mean pore size of the matrix is substantially equal to or less than that of the carbon support. As a result, there is no driving force for the acid to transfer into the electrode even when the electrode begins to lose its hydrophobicity.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A fuel cell comprising:
   an anode electrode;
   a cathode electrode;
   each of said electrodes including a waterproofing binder;
   an electrolyte;
   and a matrix member carrying said electrolyte and disposed between said anode and cathode electrodes, said matrix member having a layer having a mean pore size which is substantially equal to or less than the mean pore size of said cathode electrode.

2. A fuel cell in accordance with claim 1 wherein:
   said mean pore size of said layer is substantially equal to or less than the mean pore size of said anode electrode.

3. A fuel cell in accordance with claim 1 or 2 wherein:
   said layer includes a carbon material
   and said cathode electrode includes an underlayer of said carbon material.

4. A fuel cell in accordance with claim 3 wherein: said anode electrode includes an underlayer of carbon material.

5. A fuel cell in accordance with claim 1 wherein:
   the largest pores of said layer have diameters which are at least an order of magnitude less than the thickness of said layer.

6. A fuel cell in accordance with claim 5 wherein:
   at least about 20 percent of the pores of said layer have diameters of less than 0.04 microns.

7. A fuel cell in accordance with claim 3 wherein:
   said matrix comprises a further layer adjacent said carbon layer and comprised of an insulating material.

8. A fuel cell in accordance with claim 1 wherein:
   said electrolyte is an acid.

9. A fuel cell in accordance with claim 3 wherein:
   said waterproofing binder is polytetrafluoroethylene.

10. A fuel cell in accordance with claim 7 wherein:
    said further layer is comprised of silicon carbide material.

11. A fuel cell in accordance with claim 10 wherein:
    each of said layers further includes a binder material.

12. A fuel cell in accordance with claim 11 wherein:
    said binder material is a fluorocarbon polymer amounting to approximately less than 4 percent of the content of its respective layer.

13. A fuel cell in accordance with claim 10 wherein:
    said carbon layer is adjacent said anode electrode;
    and said carbide layer is adjacent said cathode electrode.

14. A fuel cell in accordance with claim 10 wherein:
    said carbon layer is adjacent said cathode electrode;
    and said carbide layer is adjacent said anode electrode.

15. A fuel cell in accordance with claim 1 wherein:
    said layer is adjacent a surface of said matrix.

16. A fuel cell in accordance with claim 15 wherein a surface of said layer defines said surface of said matrix.

17. A fuel cell in accordance with claim 3 wherein:
    said layer comprises a carbon material having a surface area greater than approximately 100 square meters per gram and a particle size of approximately 500 angstroms.

* * * * *